United States Patent

Clark, Jr.

[15] 3,657,489

[45] Apr. 18, 1972

[54] RECORDING INFORMATION AT REDUCED AMPLITUDE AND A SIGNAL INDICATIVE OF THE AMPLITUDE REDUCTION

[72] Inventor: Melville Clark, Jr., 8 Richard Road, Cochituate, Mass. 01778

[22] Filed: Jan. 23, 1970

[21] Appl. No.: 5,360

Related U.S. Application Data

[63] Continuation of Ser. No. 362,014, Apr. 23, 1964.

[52] U.S. Cl...........................................179/100.2 S, 333/14

[51] Int. Cl.........................................G11b 5/02, G11b 5/44

[58] Field of Search..............333/14; 179/100.2 S, 100.2 MI, 179/100.2 R; 340/174.1 G, 174.1 H

[56] References Cited

UNITED STATES PATENTS

| | | | |
|---|---|---|---|
| 3,181,133 | 4/1965 | Seitner | 179/100.2 S |
| 3,202,769 | 8/1965 | Coleman | 179/100.2 S |
| 2,960,568 | 11/1960 | Leyton | 179/100.2 S |
| 3,339,192 | 8/1967 | Zeller et al. | 179/100.2 S |

*Primary Examiner*—Bernard Konick
*Assistant Examiner*—Vincent P. Canney
*Attorney*—Charles Hieken

[57] ABSTRACT

A suitably modulated, but always high level monitor signal is derived from and transmitted with an information signal to control the quantized gains of a transmitter and a receiver in reciprocal fashion to enhance the apparent signal-to-noise ratio of the communication system. The monitor signal controls the quantized gain at the receiver, is of considerably narrower bandwidth than the bandwidth of the information signal, and does not itself introduce noise at the receiver because the monitor signal merely selects which of several gains of the receiver are to be used, in correspondence to the signal-controlled gains of the transmitter which are quantized reciprocally. The system is particularly applicable to tape recordings.

16 Claims, 10 Drawing Figures

INVENTOR.
MELVILLE CLARK JR.
BY
Ezekiel Wolf, Wolf and Greenfield
ATTORNEYS

*INVENTOR:*
MELVILLE CLARK JR.
*BY,*
Ezekiel Wolf, Wolf and Greenfield
*ATTORNEYS*

*INVENTOR:*
MELVILLE CLARK JR.
*BY,*
Ezekiel Wolf, Wolf and Greenfield
*ATTORNEYS*

INVENTOR.
MELVILLE CLARK JR.
BY *Ezekiel Wolf, Wolf and Greenfield*
ATTORNEYS

RECORDING INFORMATION AT REDUCED AMPLITUDE AND A SIGNAL INDICATIVE OF THE AMPLITUDE REDUCTION

REFERENCE TO PRIOR APPLICATION

This application is a continuation of application Ser. No. 362,014 filed Apr. 23, 1964, now abandoned.

The present invention relates in general to the recording and reproduction of signals and more particularly concerns a novel system especially useful for magnetically recording and reproducing signals with exceptionally high fidelity over a wide dynamic range of signal amplitudes while effecting a marked reduction in undesired wow and flutter.

Tape recording is widely used for recording and reproducing audio, video and other data signals. However, limitations in most available recording systems prevent faithful recording over a wide dynamic range of signal amplitudes. Still another disadvantage of such systems is the introduction of undesired wow and flutter caused by variations in relative velocity between the recording medium and the transducing means.

It is an important object of this invention to increase the dynamic range of input signals that a record-reproduce apparatus can accomodate without appreciable distortion.

It is another object of this invention to achieve the preceding object while reducing the effects of undesired wow and flutter.

According to the invention, means responsive to the amplitude of an input signal to be recorded provide a gain control signal representative of that input signal amplitude. Means responsive to the gain control signal transform the input signal with gain inversely proportional to the amplitude of the input signal so that the transformed signal is of approximately constant amplitude. A carrier signal of frequency outside the range embracing the spectral components of the input signal is modulated with the gain control signal. The modulated carrier signal may be algebraically combined with the transformed input signal to provide a combined signal that is recorded on the recording medium or the two signals may be recorded on separate tracks. The gain control signal and the transformed input signal are extracted from the recorded combined signal. Means responsive to the extracted gain control signal transform the extracted transformed input signal with gain directly proportional to the amplitude of the corresponding input signal prior to any transformation to reproduce that corresponding input signal with high fidelity.

A feature of the invention resides in employing the carrier signal for the additional function of correcting for wow and flutter. This is accomplished by measuring the contemporary frequency of the component of the combined signal providing the timing or of the monitor track and furnishing a delay that compensates the wow and flutter. As it were, the monitor track is used to measure deviations in the time of transit between the recording and reproducing means by marking off increments of the recording medium corresponding to precisely equal original time increments. The delay unit then provides enough delay to precisely equalize all these time increments marked on the recording medium by the signal of constant frequency. Since the audio signal of interest and the monitor signal are recorded simultaneously, the correction for each is identical.

Numerous other features, objects and advantages of the invention will become apparent from the following specification when read in connection with the accompanying drawing in which.

Figure 1:
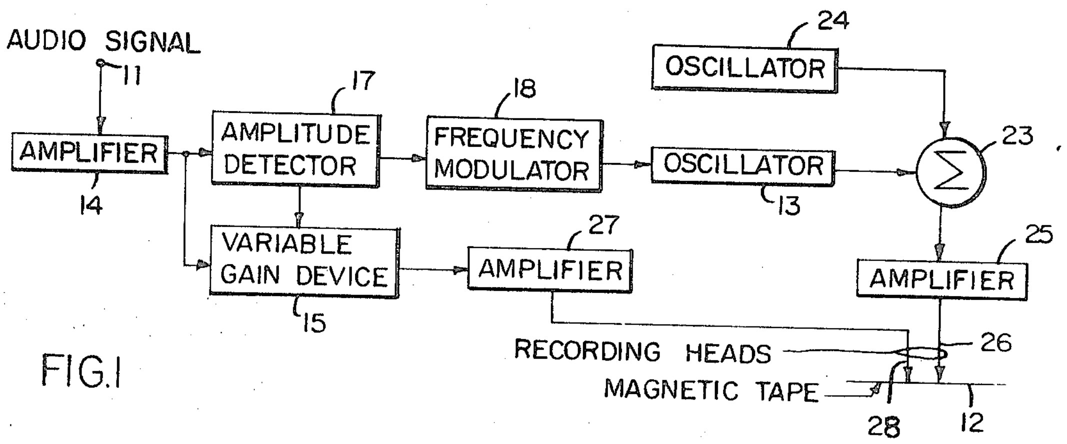
FIG. 1 is a block diagram illustrating the logical arrangement of a recording channel according to the invention.

With reference now to the drawing and more particularly to FIG. 1 thereof, there is shown a block diagram illustrating the logical arrangement of a recording channel in a system according to the invention. An audio signal applied to input terminal 11 is transformed and recorded on recording medium 12 with reduced amplitude variations together with a carrier signal provided by oscillator 13 modulated with a gain control signal representative of the contemporary amplitude of the audio signal applied to terminal 11.

Amplifier 14 amplifies the audio signal on input terminal 11. The output of amplifier 14 is applied to amplitude detector 17 to provide a signal representative of the contemporary amplitude of the input signal applied to terminal 11. This detected signal is applied to a variable gain device 15 to transform the amplified signal from amplifier 14 with a gain inversely proportional to the contemporary amplitude of the input signal applied to terminal 11. Thus, the output of the variable gain device is of substantially constant amplitude.

The detected signal from the amplitude detector 17 is also applied to the frequency modulator 18 to establish the frequency of the signal emitted by oscillator 13 as representative of the amplitude of the input signal applied to terminal 11.

An adder 23 sums the frequency modulated signal provided by oscillator 13 with a fixed frequency signal provided by oscillator 24 to provide a combined output signal that is applied to amplifier 25 for recording on magnetic tape 12 through recording head 26. The output of variable gain device 15 is amplified by amplifier 27 and then applied through recording head 28 to magnetic tape 12. The tracks on which the audio and monitor signals are recorded may be separate.

The recorded signal includes a signal waveform corresponding to that of the audio input signal applied to terminal 11 but with a nearly constant amplitude, a carrier signal modulated in frequency to indicate the amplitude of the input audio signal applied to terminal 11, and a signal of known fixed frequency which may be processed by the reproducing apparatus to correct for wow and flutter. The frequency of the signals provided by oscillators 13 and 24 are of any convenient frequency if the monitor track is separate from the audio track.

Figure 2:
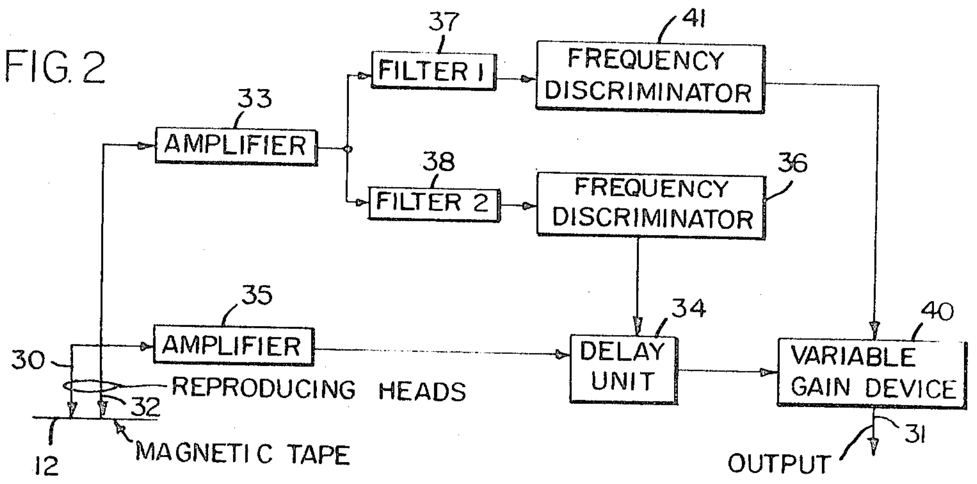
FIG. 2 is a block diagram illustrating the logical arrangement of a reproducing channel according to the invention.

Referring to FIG. 2, there is shown a block diagram illustrating the logical arrangement of the reproducing system for providing an output signal on line 31 that corresponds to the input signal that was applied to terminal 11 of the recording system of FIG. 1. Reproducing heads 30 and 32 scan the magnetic tape 12 to reproduce the signals that were recorded and deliver the signals to amplifiers 33 and 35, respectively.

Amplifier 33 provides the combined monitor signal after amplification to filters 37 and 38. Filter 37 transmits the spectral components of the frequency modulated signal provided by oscillator 13 to frequency discriminator 41 to provide a gain control signal to variable gain device 40 establishing the gain directly proportional to that of the amplitude of the corresponding audio signal that was applied to input terminal 11.

Filter 38 transmits the spectral components about the fixed frequency of oscillator 24 to frequency discriminator 36. Frequency discriminator 36 then provides a signal representative of frequency variations in the reproduction of the fixed frequency signal provided by oscillator 24 representative of wow and flutter to delay unit 34 to control the delay furnished thereby so as to correct for wow and flutter introduced by the transport mechanism.

Amplifier 35 transmits the spectral component of the audio signal to delay unit 34 so that the output of delay unit 34 is substantially a reproduction of the waveform of the corresponding audio signal that was applied to terminal 11. The latter signal is then applied to variable gain device 40 which adjusts the amplitude of the latter signal waveform so that the output signal applied to terminal 31 is substantially a reproduction of the corresponding audio signal that was applied to terminal 11.

Figure 3:
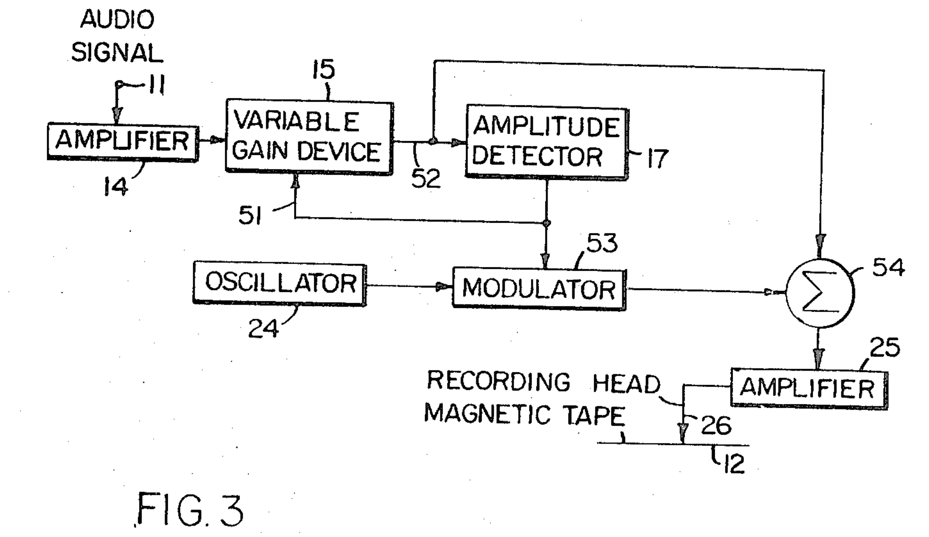
FIG. 3 is a block diagram illustrating the logical arrangement of a recording channel according to the invention incorporating sensing in feedback loops to enhance the accuracy of correction afforded by error signals.

Referring to FIG. 3, there is shown a block diagram illustrating the logical arrangement of an alternate recording system embodying the principles of this invention. The input audio signal applied to terminal 11 is amplified by amplifier 14 and applied to variable gain device 15. Amplitude detector 17 receives the output signal from variable gain device 15 to provide a control signal on line 51 which tends to maintain the signal on line 52 of substantially constant amplitude. This gain control signal is also applied to modulator 53 as a modulating signal to modulate fixed frequency oscillator 24 in amplitude. The modulated carrier signal provided by modulator 53 is summed with the substantially constant amplitude audio signal provided by variable gain device 15 in adder 54 which provides a combined signal to amplifier 25. Amplifier 25 delivers the amplified signal to recording head 26 for recording on magnetic tape 12.

The gain control signal provided by amplitude detector 17 is inversely proportional to the amplitude of the signal applied to input terminal 11 so that the modulation envelope of the modulated carrier signal provided by modulator 53 is characteristic of the amplitude of the input signal applied to terminal 11 while the signal provided by variable gain device 15 is accurately representative of the signal waveform.

Figure 4:
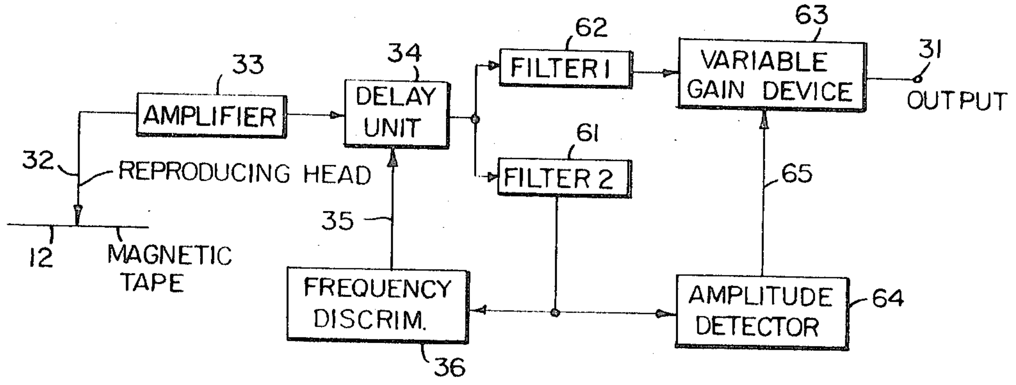
FIG. 4 is a block diagram illustrating the logical arrangement of a reproducing channel in a system incorporation sensing in feedback loops.

Referring to FIG. 4, there is shown a block diagram illustrating the logical arrangement of a reproducing system for accurately reproducing a signal recorded by the system of FIG. 3 with reduced wow and flutter, while capable of accomodating a wide range of dynamic amplitude levels. Reproducing head 32 scans the magnetic tape 12 to reproduce the recorded combined signal. Amplifier 33 amplifies the reproduced combined signal and applies it to delay unit 34 which furnishes a delay to the combined signal tending to correct for wow and flutter in accordance with a correction signal provided on line 35 provided by frequency discriminator 36.

Carrier frequency filter 61 extracts that portion of the reproduced combined signal provided by delay unit 34 having spectral components centered about the fixed frequency of oscillator 24 so that frequency variations representative of wow and flutter are transmitted and amplitude variations corresponding to the amplitude modulation applied by modulator 53 are also transmitted while rejecting the spectral components of the audio input signal that was applied to terminal 11.

The audio filter 62 may be a low pass filter which transmits the spectral components in the audio signal applied to terminal 11 while rejecting spectral components transmitted by carrier filter 61. Audio filter 62 transmits the components of the reproduced combined signal corresponding to the audio input signal to variable gain device 63 whose gain is made proportional to the amplitude of the corresponding portion of the original audio input signal that was applied to terminal 11 so that the output signal waveform on terminal 31 is an accurate reproduction of the input audio signal applied to terminal 11, relatively free from wow and flutter, and exhibiting virtually the same dynamic range. To this end, the modulation envelope of the reproduced carrier signal transmitted by filter 61 is detected by amplitude detector 64 to provide a gain control signal on line 65 that is applied to variable gain device 63.

Both record-reproduce systems offer the advantages of both correcting for wow and flutter and appreciably increasing the range of amplitude variations which may be recorded and reproduced with low distortion. The system described in FIGS. 3–4 incorporates a number of additional advantages. By locating the various detecting units in feedback loops, the transformation signals generated and the transformation and retransformation of the audio signal may be made relatively independent of the characteristics of the circuit, such as the properties of tubes or transistors, temperature, and the like. Further, no fine adjustment needs to be carefully made. Thus, locating amplitude detector 17 to monitor the constancy of the output of the variable gain device 15 facilitates establishing a gain control signal for regulating this amplitude accurately. Furthermore, only a single monitor signal modulated in amplitude by the amplitude of the audio signal applied to the input is required. This monitor signal can also serve as a timing signal and be used to discriminate and measure variations in the transit time between the recording and reproducing heads, i.e., variations in the speed of the recording medium. Relatively few components are needed by this system.

The improvement in the signal-to-noise ratio of a tape recording system according to the invention is related to the ratio of the bandwidth of the input audio signal applied to terminal 11 to that of the gain control signal applied to the controlled gain devices. Since the audio bandwidth is at least of the order of 10,000 c.p.s. and since the bandwidth of the amplitude controlling information is only 100 c.p.s., an improvement in signal-to-noise ratio of the order of 20 db in a system of the type described in FIGS. 3–4 may be expected. Furthermore, the effects of print through, tape noise and electronic noise are appreciably reduced. Still another advantage of the invention is that the signal provided by oscillator 24 may be the bias signal already used in the recording process of conventional tape recorders, this bias frequency being typically of the order of 100 kc in a typical recorder. Despite the high frequency of bias signals a little is always recorded. And the wow and flutter correcting aspects of the present invention may be used in systems in which the audio information is recorded through frequency, phase, or other time modulation of a carrier signal that is recorded to effectively enhance signal-to-noise ratio.

While the system of FIGS. 3 and 4 record everything on a single track, there may be other advantages in employing separate tracks for recording the audio signal and the modulated carrier signal. First, band pass filters are not required. Second, the frequency of the carrier signal may be in the same frequency band embracing spectral components of the audio input signal.

As noted above, the improvement in signal-to-noise ratio in the systems described above is directly proportional to the ratio of the bandwidth of the audio signal to that of the modulated carrier signal. The bandwidth of the latter signal is preferably not so narrow as to cause a smearing of fast transients, such as occur in speech and music, and not so wide as to result in an inadequate improvement in signal-to-noise ratio. A quantized control of the magnitude of the audio signal can yield even more improvement in the signal-to-noise ratio.

Figure 5:
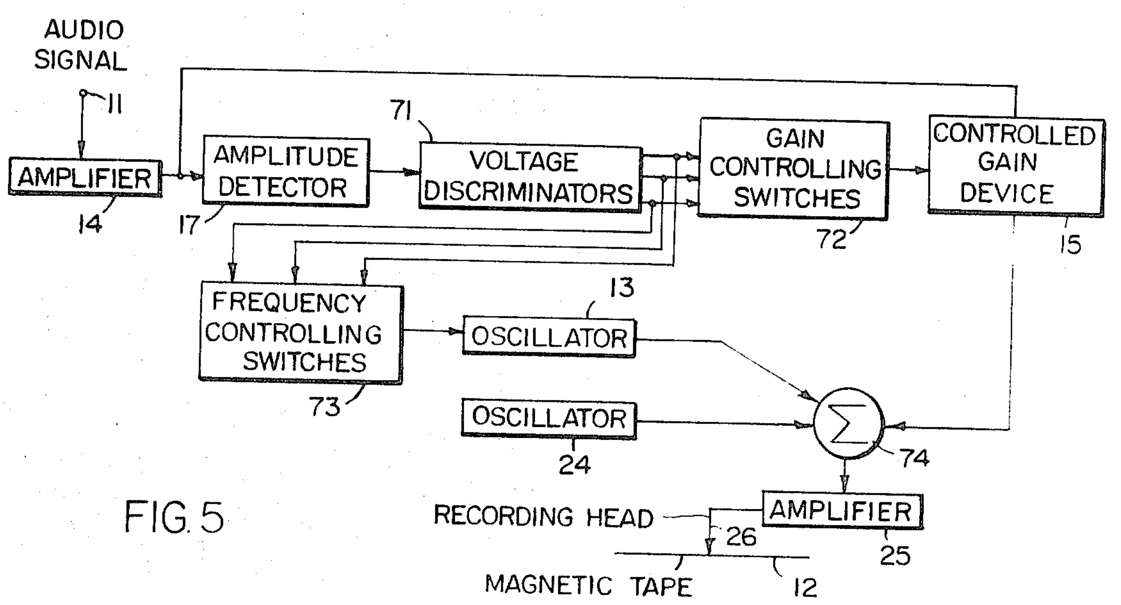
FIG. 5 is a block diagram illustrating the logical arrangement of a recording channel embodying the principles of the invention in a system employing quantization techniques.

Referring to FIG. 5, there is shown a block diagram illustrating the logical arrangement of a recording system embodying quantized control. An audio signal applied to input terminal 11 is transformed and recorded on recording medium 12 with reduced amplitude variations together with the carrier signal provided by oscillator 13 modulated with the gain control signal representative of the amplitude of the audio signal applied to terminal 11.

Amplifier 14 amplifies the audio signal on input terminal 11. A controlled gain device 15 transforms the amplified signal from amplifier 14 with gain inversely proportional to the quantized amplitude of the input signal applied to terminal 11.

The output of amplifier 14 is also applied to amplitude detector 17 to provide a signal representative of the contemporary amplitude of the input signal applied to terminal 11. This detected signal is applied to voltage discriminators 71 which provide a pseudostatic output on one or more of the output lines. Whenever the amplitude of the detected signal at the input to the voltage discriminator 71 is less than some preselected level 1, no output appears on any line. When the amplitude of the detected signal is between levels 1 and 2, an output appears on line 1; when the amplitude of the detected signal is between levels 2 and 3, an output appears on lines 1 and 2. Finally, when the amplitude is above preselected level 3, an output appears on lines 1, 2, and 3. These various output signals set the gain controlling switches 72 which alter the gain of controlled gain device 15 and set the frequency controlling switches 73 which alter the frequency of the oscillator 13.

An adder 74 sums the audio signal provided by controlled gain device 15 with the carrier signal provided by oscillator 13 having a frequency representative of the gain imparted by controlled gain device 15 and a fixed frequency signal provided by oscillator 24 to provided a combined output signal that is applied to amplifier 25 for recording on magnetic tape 12 through recording head 26.

Figure 6:
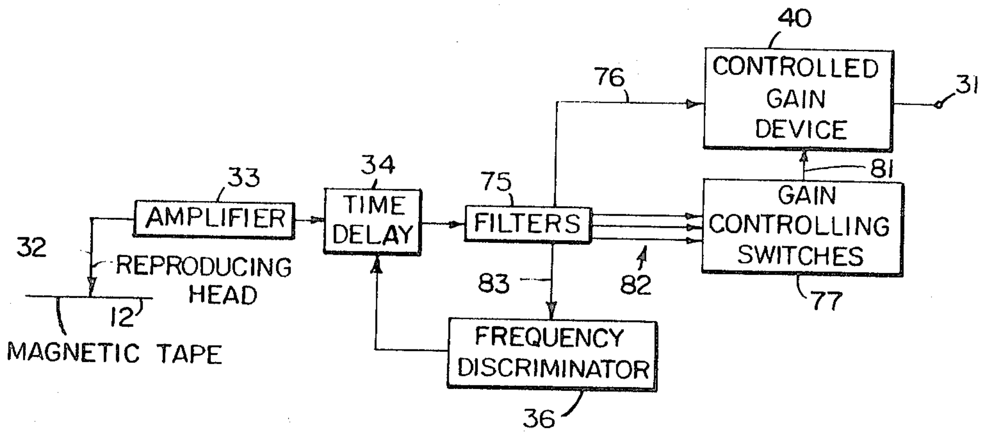
FIG. 6 is a block diagram of a reproducing channel which coacts with the recording channel of FIG. 5 in a record-reproduce system according to the invention.

Referring to FIG. 6, there is shown a block diagram illustrating the logical arrangement of a reproducing system for providing an output signal on line 31 that corresponds to the input signal that was applied to terminal 11 of the recording system of FIG. 5. A reproducing head 32 scans magnetic tape 12 to reproduce the combined signal that was recorded. Amplifier 33 amplifies this combined signal. The delay unit 34 furnishes a delay to the amplified signal related to a control signal provided by frequency discriminator 36. The delayed amplified combined signal is then applied to filters 75. Filters 75 separate the audio signal from the gain control signal and the timing signal. Controlled gain device 40 receives the reproduced audio signal waveform on line 76 and provides that waveform on terminal 31 with amplitude proportional to that of the corresponding signal applied to terminal 11 for recording so that the amplitude of the input audio signal is reproduced on terminal 31 relatively free from wow and flutter.

Gain controlling switches 77 provide a gain control signal on line 81 for establishing the gain of the controlled gain device 40 to be directly proportional to the amplitude of the corresponding portion of the input audio signal that was applied to terminal 11 of the recording system. The gain controlling switches 77 establish this gain in response to the signals passed by filters 75 on lines 82. Frequency discriminator 36 receives a signal on line 83 from filters 75 corresponding to the reproduction of the fixed frequency signal provided by oscillator 24 with frequency variations corresponding to the wow and flutter. Frequency discriminator 36 responds to these frequency or time deviations by providing a control signal that continuously adjusts the time delay furnished by delay unit 34 so as to reduce the time variations and resulting wow and flutter in signals delivered to filters 75.

Figure 7:
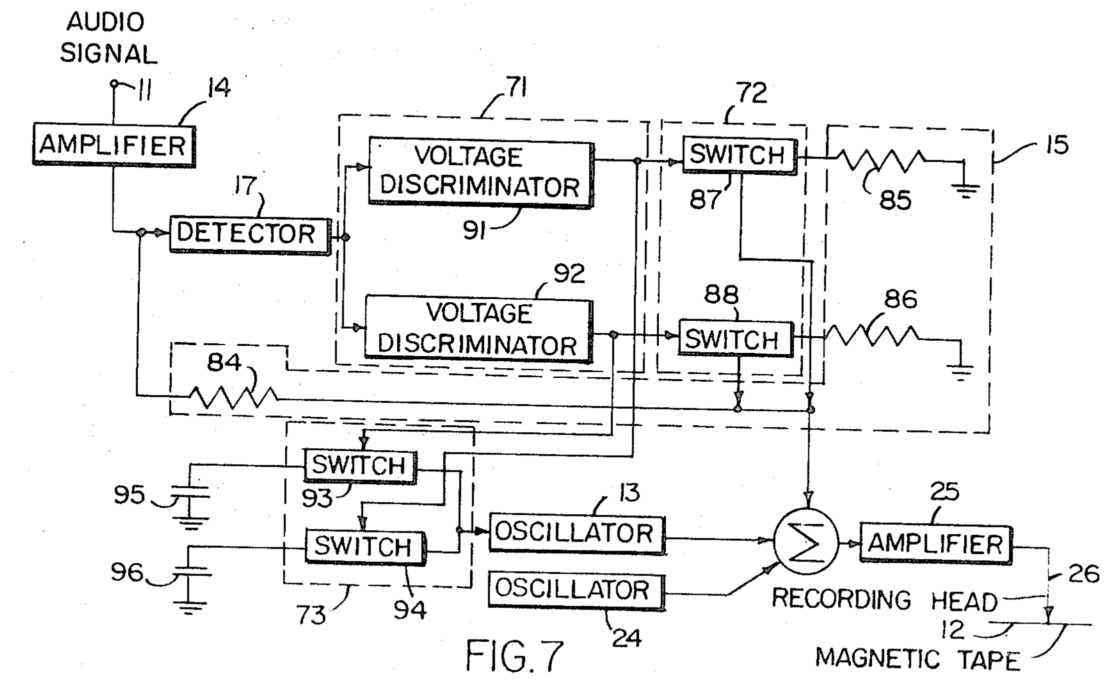
FIGS. 7 and 8 illustrate specific versions of the apparatus of FIGS. 5 and 6, respectively.
Figure 8:
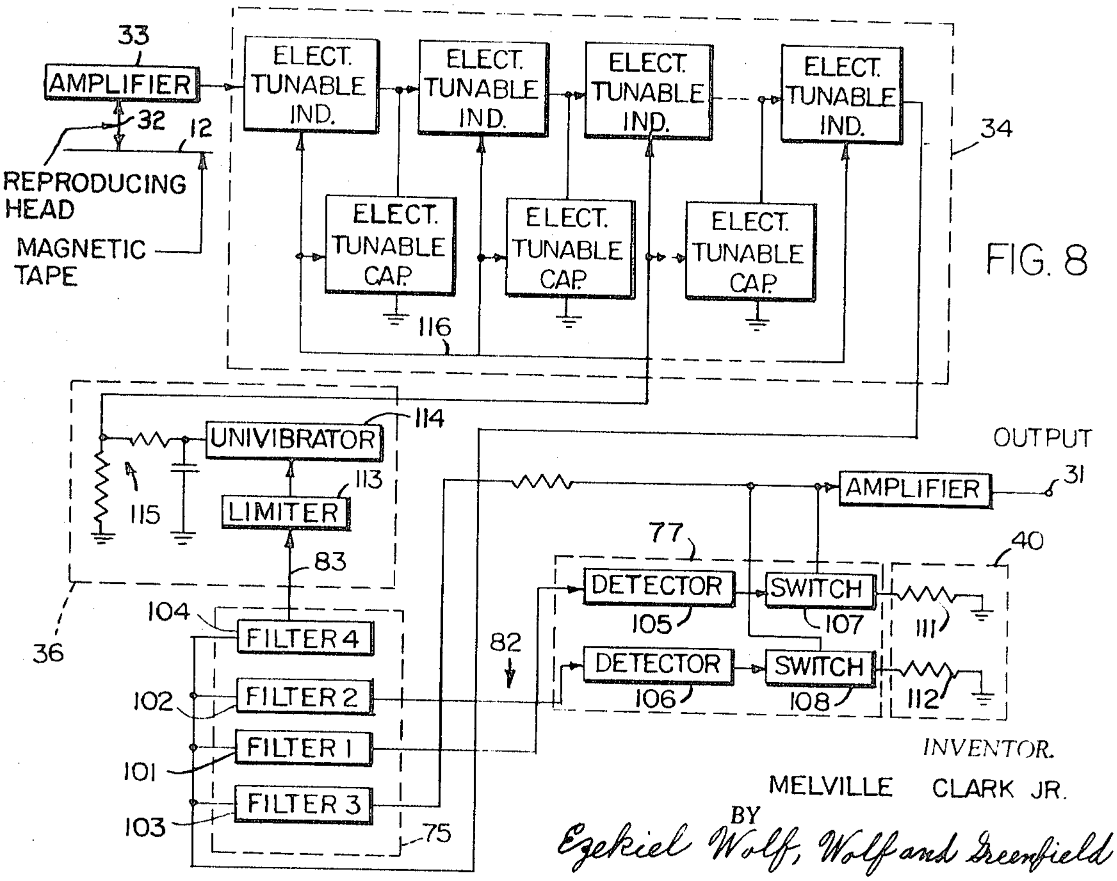

Referring to FIGS. 7 and 8, there are illustrated combined block-schematic circuit diagrams illustrating the logical arrangement of a more detailed embodiment of the record-reproduce system of FIGS. 5 and 6. With specific reference to FIG. 7, the controlled gain device 15 is shown as a precision attenuator comprising a precision resistor 84 in series with resistor 85 and/or 86 switched in by switches 87 and/or 88, respectively. Switches 87 and 88 are closed respectively by voltage discriminators 91 and 92 which provide respective output signals when the amplitude of the audio signal provided by the detector 17 is above corresponding respective levels.

In a similar manner switches 93 and 94 of frequency controlling switches 73 are respectively closed by outputs from voltage discriminators 91 and 92 to switch corresponding ones of frequency controlling capacitors 95 and 96 into the frequency controlling circuit of oscillator 13.

Referring specifically to FIG. 8, the filters 75 comprise four filters. The first two filters 101 and 102 transmit respective signal frequencies provided by oscillator 13, with respective switches 93 and 94 closed, to the gain controlling switches 77. The third filter 103 transmits the audio spectrum to the output terminal 31. The fourth filter 104 selectively transmits spectral components about the fixed frequency of oscillator 24 to the frequency discriminator 36.

The gain controlling switches 77 comprise detectors 105 and 106 for detecting the presence of signals transmitted by filters 101 and 102 respectively, to then close switches 107 and 108, respectively, which switch in precision resistors 111 and 112, respectively, to establish the correct gain at the input of the output amplifier.

Frequency discriminator 36 comprises a limiter 113 for converting the signal transmitted by filter 104 into a signal of substantially rectangular waveform, a univibrator or monostable multivibrator 114 and a low pass filter 115. The univibrator provides pulses of uniform duration at a rate corresponding to the frequency of the rectangular triggering signal provided by limiter 113. The low pass filter 115 then provides a slowly varying control signal on line 116 representative of the wow and flutter. The higher the frequency applied to the frequency discriminator, the more frequent the precision pulses from the univibrator appear, and the greater the magnitude of the signal created by the low pass filter. Thus, the frequency discriminator and the timing signal can be exploited to create a time-error correcting signal that is applied to the delay unit.

Figure 9:
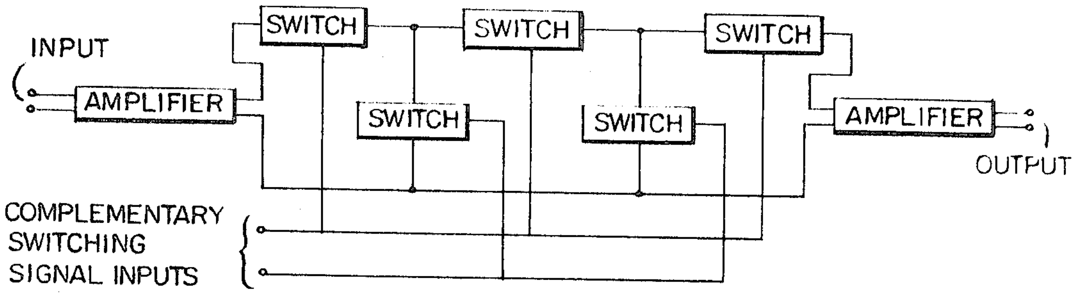
FIG. 9 shows a preferred switching arrangement for use in a system according to the invention.

Delay unit 34 is shown as a lumped parameter delay line with series electrically controllable inductances and shunt electrically controllable capacitances. The delay furnished by each section is $\sqrt{LC}$. By increasing the LC product when an increase in frequency is sensed by frequency discriminator 36, the delay furnished by delay unit 34 to the reproduced audio signal is increased to compensate for the increased speed of motion of the recording medium and reduced transit time between the recording and reproducing heads, so that the signal reproduced on the terminal 31 is relatively free of the effects of wow and flutter. The inductance and capacitance elements may be conventional reactance tube circuits well-known in the art. Gates with two transistors back-to-back and in the inverted connection and four diode gates have been found particularly useful. The on-off ratio of gates can be improved by the ladder arrangement shown in FIG. 9. The series switches (horizontal) are turned on when the parallel (vertical) switches are turned off and conversely. The cascade may be continued indefinitely.

Figure 10:
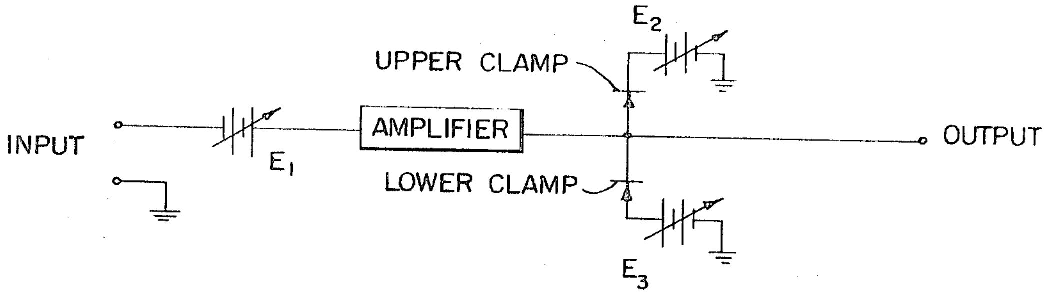
FIG. 10 shows a preferred form of voltage discriminator for use in a system according to the invention.

A voltage discriminator suitable for our use is shown in FIG. 10. The amplifier greatly magnifies the range through which the input signal swings; the output of the amplifier is clamped by two diodes. The upper clamping level is $E_2$ and may be separately adjusted from the lower clamping level $E_3$. These potentials define the two states of the voltage discriminator. The input potential may be biased with a variable potential $E_1$ so that the level at which the input potential is discriminated may be selected by the operator. Alternatively, a differential amplifier may be used with the biasing potential applied to one side of the amplifier and the input signal applied to the other stage. To understand the operation let us first assume the biasing potential is zero. Then as the input signal is moved from a very negative value to less negative values, the output of the amplifier is clamped hard against the potential $E_3$, which may be negative or positive. In a very small region for the input potential around zero, the amplifier output will swing from the clamping potential $E_3$ to the clamping potential $E_2$. These may be brought as close together as desired and the gain of the amplifier may be made as large as desired to make the transition region as small as desired. The biasing potential $E_1$ merely makes it possible to select the midpoint of the transition region, so that any level may be used for discrimination.

There has been described novel record-reproduce systems capable of operating over a wide dynamic range of signal amplitudes while minimizing the effects of wow and flutter. The specific embodiments described herein are by way of example for illustrating the best mode now contemplated for practicing the invention. It is evident that those skilled in the art may now make numerous modifications and uses of and departures from the specific embodiments disclosed herein without departing from the inventive concepts. Consequently, the invention is to be construed as limited solely by the spirit and scope of the appended claims.

What is claimed is:

1. Apparatus for recording and reproducing electrical signals comprising, a source of an input signal to be recorded, a source of at least one carrier signal, means responsive to the amplitude of said input signal for providing a quantized gain control signal representative of that one of a plurality of contiguous amplitude ranges then embracing the amplitude of said input signal, said plurality being at most four, means responsive to said gain control signal for translating said input signal with gain inversely proportional to absolute displacement of said that one of a plurality of contiguous amplitude ranges from zero amplitude, means for modulating one of said carrier signals with said gain control signal, a recording medium, means for recording said carrier and said translated input signal on said recording medium, means for extracting the recorded signal from said recording medium, means for extracting the gain control signal and the translated input signal from the extracted recorded signal, and means responsive to the extracted gain control signal for translating the extracted translated input signal with gain directly proportional to the amplitude of the corresponding input signal prior to any translation to provide substantially said corresponding input signal as an output reproduced signal.

2. Apparatus for recording and reproducing electrical signals comprising, a source of an input signal to be recorded, a source of at least one carrier signal, means responsive to the amplitude of said input signal for providing a gain control signal, means responsive to said gain control signal for translating said input signal with gain inversely proportional to the amplitude of said input signal, a recording medium, means for recording said carrier and said translated input signal on said recording medium, means for extracting the recorded signal from said recording medium, means for extracting a gain control signal and the translated input signal from the extracted recorded signal, means responsive to the extracted gain control signal for translating the extracted translated input signal with gain directly proportional to the amplitude of the corresponding input signal prior to any translation to provide substantially said corresponding input signal as an output reproduced signal, at least one of said carrier signals being of fixed frequency, means for extracting the recorded fixed frequency carrier signal from said recording medium, means responsive to the extracted recorded fixed frequency carrier signal for providing a correctional signal representative of wow and flutter components in the extracted translated input signal, and signal delay means for furnishing a delay to the extracted translated input signal and responsive to said correctional signal for reducing the wow and flutter components in said output reproduced signal, wherein said means for extracting the recorded signal from said recording medium includes a reproducing head for scanning said recording medium to provide the extracted recorded signal, said means for extracting the gain control signal and the translated input signal from the extracted recorded signal includes a first filter for transmitting audio frequency spectral components while excluding spectral components about said fixed frequency, a second filter for transmitting spectral components about said fixed frequency, and amplitude detecting means responsive to the envelope of the signal transmitted by said second filter for providing said extracted gain control signal, and said means responsive to the extracted recorded fixed frequency carrier signal includes a frequency discriminator responsive to the signal transmitted by said second filter for providing said correctional signal.

3. Apparatus for recording and reproducing electrical signals comprising, a source of an input signal to be recorded, a source of at least one carrier signal, means responsive to the amplitude of said input signal for providing a gain control signal, means responsive to said gain control signal for translating said input signal with gain inversely proportional to the amplitude of said input signal, means for modulating one of said carrier signals with said gain control signal, a recording medium, means for recording said carrier and said translated input signal on said recording medium, means for extracting the recorded signal from said recording medium, means for extracting the gain control signal and the translated input signal from the extracted recorded signal, means responsive to the extracted gain control signal for translating the extracted translated input signal with gain directly proportional to the amplitude of the corresponding input signal prior to any translation to provide substantially said corresponding input signal as an output reproduced signal, at least one of said carrier signals being of fixed frequency, means for extracting the recorded fixed frequency carrier signal from said recording medium, means responsive to the extracted recorded fixed frequency carrier signal for providing a correctional signal representative of wow and flutter components in the extracted translated input signal, and means responsive to said correctional signal for reducing the wow and flutter components in said output reproduced signal, said means responsive to said extracted recorded fixed frequency carrier signal comprising a frequency discriminator providing said correctional signal, said means responsive to said correctional signal comprising controllable delay means for furnishing a delay in the signal transmission path providing said output reproduced signal that is directly proportional to the instantaneous frequency of the extracted recorded fixed frequency carrier signal, wherein said controllable delay means comprises a lumped parameter delay line including storage elements with electrically controllable parameters, and means for coupling said correctional signal to said storage elements.

4. Apparatus in accordance with claim 3 wherein said storage elements include series inductors and shunt capacitors.

5. Apparatus for recording and reproducing electrical signals comprising, a source of an input signal to be recorded, a source of at least one carrier signal, combining means for combining a first signal derived from said input signal with a second signal derived from said at least one carrier signal source, means including variable gain means for coupling said input signal to said combining means and providing said first signal, amplitude detecting means responsive to the amplitude of said first signal for providing a gain control signal, means for coupling said gain control signal to said variable gain means so that the gain of said variable gain means is inversely proportional to the amplitude of said input signal, means for modulating said at least one carrier signal with said gain control signal to provide said second signal, a recording medium, means for recording the combined first and second signals provided by said means for combining on said recording medium, means for extracting the recorded signal from said recording medium, means for extracting the gain control signal and the translated input signal from the extracted recorded signal, and means responsive to the extracted gain control signal for translating the extracted translated input signal with gain directly proportional to the amplitude of the corresponding input signal prior to any translation to provide substantially said corresponding input signal as an output reproduced signal, wherein said means for modulating amplitude modulates said at least one carrier signal, said means for extracting the gain control signal and the translated input signal from the extracted recorded signal comprises, controllable delay means for furnishing a controllable delay to the extracted recorded signal, means for separating the recorded first signal and the recorded second signal from the controllably delayed extracted recorded signal, means responsive to the frequency of the separated recorded second signal for providing a delay control signal, means for coupling said delay control signal to said controllable delay means to furnish a delay tending to reduce wow and flutter, an output terminal, variable gain means for coupling the separated recorded first signal to said output terminal, means responsive to the amplitude of the separated recorded second signal for providing a gain control signal, and means for coupling the latter gain control signal to the latter variable gain device to provide on said output terminal a signal directly proportional to the corresponding input signal and relatively free of wow and flutter.

6. Apparatus in accordance with claim 5 and further comprising, an output terminal, means responsive to said delayed recovered signal for separating an information signal related to said recorded first signal from a modulating signal related to said recorded second signal, variable gain means for coupling said information signal to said output signal, means responsive to said modulating signal for providing a gain control signal, and means for coupling said gain control signal to said variable gain device for establishing the gain thereof so that the signal on said output terminal corresponds to said input date signal.

7. Apparatus for recording and reproducing electrical signals comprising, a source of an input signal to be recorded, a source of at least one carrier signal, means responsive to the amplitude of said input signal for providing a quantized gain control signal representative of that one of a plurality of contiguous amplitude ranges then embracing the amplitude of said input signal, means responsive to said gain control signal for translating said input signal with gain inversely proportional to absolute displacement of said that one of a plurality of contiguous amplitude ranges from zero amplitude, means for modulating one of said carrier signals with said gain control signal, a recording medium, means for recording said carrier and said translated input signal on said recording medium, means for extracting the recorded signal from said recording medium, means for extracting the gain control signal and the translated input signal from the extracted recorded signal, and means responsive to the extracted gain control signal for translating the extracted translated input signal with gain directly proportional to the amplitude of the corresponding input signal prior to any translation to provide substantially said corresponding input signal as an output reproduced signal, wherein said means for providing a quantized gain control signal includes a voltage discriminator comprising, a voltage discriminator output terminal, an upper source of an adjustable upper clamping potential, a lower source of an adjustable lower clamping potential that is lower than said upper clamping potential, upper unilaterally conducting means intercoupling said upper source and said voltage discriminator output terminal for limiting the maximum potential on the latter output terminal to said upper clamping potential, lower unilaterally conducting means intercoupling said lower source and said voltage discriminator output terminal for limiting the minimum potential on the latter output terminal to said lower clamping potential, and voltage discriminator amplifying means coupled to the latter output terminal for amplifying said input signal and coupling the amplified input signal to the latter output terminal.

8. Apparatus in accordance with claim 7 and further comprising, means for biasing said input signal with a prescribed offset potential, and means for coupling said input signal biased by said offset potential to said voltage discriminator amplifying means.

9. Apparatus for recording and reproducing electrical signals comprising, a source of an input signal to be recorded, a source of at least one carrier signal, means responsive to the amplitude of said input signal for providing a quantized gain control signal representative of that one of a plurality of contiguous amplitude ranges then embracing the amplitude of said input signal, means responsive to said gain control signal for translating said input signal with gain inversely proportional to absolute displacement of said that one of a plurality of contiguous amplitude ranges from zero amplitude, means for modulating one of said carrier signals with said gain control signal, a recording medium, means for recording said carrier and said translated input signal on said recording medium, means for extracting the recorded signal from said recording medium, means for extracting the gain control signal and the translated input signal from the extracted recorded signal, and means responsive to the extracted gain control signal for translating the extracted translated input signal with gain directly proportional to the amplitude of the corresponding input signal prior to any translation to provide substantially said corresponding input signal as an output reproduced signal, wherein said means responsive to the amplitude of said input signal for providing a gain control signal comprises a plurality of signal amplitude discriminators, said means responsive to said gain control signal comprises a switchable resistor for each of said discriminators, a first attenuating resistor and means for selectively connecting each of said switchable resistors in series with said first attenuating resistor to coact therewith and function as an attenuator for translating said input signal with gain inversely proportional to the amplitude of said input signal.

10. Apparatus for recording and reproducing electrical signals in accordance with claim 9 wherein said means responsive to the extracted gain control signal comprises a plurality of detectors, a switchable resistor for each of said detectors, a second attenuating resistor, and means for selectively connecting each of the last-mentioned switchable resistors in series with said second attenuating resistor to coact therewith and function as an attenuator for translating the extracted translated input signal with gain directly proportional to the amplitude of the corresponding input signal prior to any translation.

11. Apparatus for recording and reproducing electrical signals comprising,
a source of an input signal to be recorded,
a source of at least one carrier signal,
a recording medium,
means for coupling said input signal and said carrier signal to said recording medium to record said carrier and a signal related to said input signal on said recording medium,
means for extracting a recorded signal related to said input signal from said recording medium,
means responsive to the latter extracted signal for providing an output reproduced signal corresponding substantially to the corresponding input signal,
means for extracting the recorded fixed frequency carrier signal from said recording medium,
means responsive to the extracted recorded fixed frequency carrier signal for providing a correctional signal representative of wow and flutter components in the extracted signals,
and variable delay means responsive to said correctional signal for furnishing a variable delay in the path of said latter extracted signal for reducing the wow and flutter components in said output reproduced signal,
said means responsive to said extracted recorded fixed frequency carrier signal comprising a frequency discriminator providing said correctional signal,
said variable delay means comprising controllable delay means for furnishing a delay in the signal transmission path providing said output reproduced signal that is directly proportional to the instantaneous frequency of the extracted recorded fixed frequency carrier signal.

12. Apparatus in accordance with claim 11 wherein said controllable delay means comprises a lumped parameter delay line including storage elements with electrically controllable parameters,
and means for coupling said correctional signal to said storage elements.

13. Apparatus in accordance with claim 12 wherein said storage elements include series inductors and shunt capacitors.

14. Apparatus for recording and reproducing electrical signals comprising,
a source of an input signal to be recorded,
a source of at least one carrier signal,
means responsive to the amplitude of said input signal for providing a gain control signal,
means responsive to said gain control signal for translating said input signal with gain inversely proportional to the amplitude of said input signal,
a recording medium,
means for recording said carrier and said translated input signal on said recording medium,
means for extracting the recorded signal from said recording medium,
means for extracting a gain control signal and the translated input signal from the extracted recorded signal,
means responsive to the extracted gain control signal for translating the extracted translated input signal with gain directly proportional to the amplitude of the corresponding input signal prior to any translation to provide substantially said corresponding input signal as an output reproduced signal,
at least one of said carrier signals being of fixed frequency,
means for extracting the recorded fixed frequency carrier signal from said recording medium,
means responsive to the extracted recorded fixed frequency carrier signal for providing a correctional signal representative of wow and flutter components in the extracted translated input signal,
and signal delay means for furnishing a delay to the extracted translated input signal and responsive to said correctional signal for reducing the wow and flutter components in said output reproduced signal,
wherein there are at least two of said carrier signals,
one of said carrier signals being time modulated with said gain control signal.

15. Apparatus in accordance with claim 14 wherein said means for extracting the recorded signal from said recording medium includes a reproducing head for scanning said recording medium to provide the extracted recorded signal,
said means for extracting the gain control signal and the translated input signal from the extracted recorded signal includes a first filter for transmitting audio frequency spectral components while excluding spectral components about said fixed frequency and spectral components of the carrier signal time modulated with said gain control signal, a second filter for transmitting spectral components about said fixed frequency while excluding the audio frequency spectral components transmitted by said first filter and said spectral components of the carrier signal time modulated with said gain control signal, at least a third filter for transmitting spectral components about one frequency assumed by the carrier signal time modulated with said gain control signal while excluding spectral components about another frequency assumed by the latter carrier signal, at least a fourth filter for transmitting spectral components about said another frequency while excluding spectral components about said one frequency, and amplitude detecting means responsive to the signals transmitted by said third and fourth filters for providing said extracted gain control signal,
and said means responsive to the extracted recorded fixed frequency carrier signal includes a frequency discriminator responsive to the signal transmitted by said second filter for providing said correctional signal.

16. Apparatus in accordance with claim 14 wherein said means for recording said carrier and said translated input signal on said recording medium includes a first recording head for recording said translated input signal on a first portion of said recording medium and a second recording head for recording said carrier signals on a second portion of said recording medium,
said means for extracting the recorded signal from said recording medium includes a first reproducing head for scanning said first portion to provide said extracted translated input signal and a second reproducing head for scanning said second portion to provide the extracted carrier signals,
said means for extracting the gain control signal includes a first filter coupled to said second reproducing head for transmitting spectral components of the carrier signal time modulated with said gain control signal, and detecting means responsive to the time modulation of the latter carrier signal for providing said gain control signal,
and said means responsive to the extracted recorded fixed frequency carrier signal comprises a second filter coupled to said second reproducing head for transmitting spectral components about said fixed frequency while excluding spectral components of the carrier signal time modulated with said gain control signal, and frequency discriminator means responsive to the signal transmitted by said second filter for providing said correctional signal.

* * * * *